(12) United States Patent
Westerman et al.

(10) Patent No.: US 9,058,066 B2
(45) Date of Patent: Jun. 16, 2015

(54) SUPPRESSING ERRANT MOTION USING INTEGRATED MOUSE AND TOUCH INFORMATION

(75) Inventors: Wayne Carl Westerman, San Francisco, CA (US); Christopher Tenzin Mullens, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1058 days.

(21) Appl. No.: 12/269,830

(22) Filed: Nov. 12, 2008

(65) Prior Publication Data

US 2010/0117962 A1    May 13, 2010

(51) Int. Cl.
G06F 3/033    (2013.01)
G06F 3/0354    (2013.01)
G06F 3/0488    (2013.01)

(52) U.S. Cl.
CPC ........ G06F 3/03543 (2013.01); G06F 3/03547 (2013.01); G06F 3/04883 (2013.01)

(58) Field of Classification Search
CPC .. G06F 3/033; G06F 3/03547; G06F 3/04883
USPC .......................................... 345/163, 175, 173
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,543,591 A | 8/1996 | Gillespie et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,967,643 B2 * | 11/2005 | Tichy et al. .................. | 345/157 |

(Continued)

FOREIGN PATENT DOCUMENTS

| | | | |
|---|---|---|---|
| JP | 2000-163031 A | 6/2000 |
| JP | 2002-342033 A | 11/2002 |
| WO | WO-2010/056916 A1 | 5/2010 |

OTHER PUBLICATIONS

Westerman, Wayne, Hand Tracking, Finger Indentification, and Chordic Manipulation on a Multi-Touch Surface, Spring, 1999.

(Continued)

*Primary Examiner* — Andrew Sasinowski
(74) *Attorney, Agent, or Firm* — Morrison & Foerster LLP

(57) ABSTRACT

The suppression of errant motion regarding a mouse is disclosed. Mouse and touch information can be integrated to determine whether a gesture made on a surface of the mouse is errant, such as when a mouse is being moved and the fingers holding the mouse inadvertently move on the mouse surface. A gesture motion that is small relative to mouse motion can be considered errant and therefore at least partially suppressed, while a gesture motion that is large relative to mouse motion can be considered an intended gesture and therefore processed. Similarly, mouse and touch information can be integrated to determine whether a mouse motion is errant, such as when a robust gesture being made on the mouse surface inadvertently moves the mouse. A mouse motion that is small relative to gesture motion can be considered errant and therefore at least partially suppressed, while a mouse motion that is large relative to gesture motion can be considered an intended motion and therefore processed.

32 Claims, 12 Drawing Sheets

(56) References Cited

U.S. PATENT DOCUMENTS

| | | | |
|---|---|---|---|
| 7,015,894 | B2 | 3/2006 | Morohoshi |
| 7,168,047 | B1* | 1/2007 | Huppi .......................... 715/784 |
| 7,184,064 | B2 | 2/2007 | Zimmerman et al. |
| 7,358,963 | B2 | 4/2008 | Low et al. |
| 7,663,607 | B2 | 2/2010 | Hotelling et al. |
| 8,479,122 | B2 | 7/2013 | Hotelling et al. |
| 2005/0248532 | A1* | 11/2005 | Moon et al. .................. 345/163 |
| 2005/0253806 | A1 | 11/2005 | Liberty et al. |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2007/0085157 | A1* | 4/2007 | Fadell et al. .................. 257/428 |
| 2007/0139395 | A1* | 6/2007 | Westerman et al. ........... 345/173 |
| 2008/0240523 | A1 | 10/2008 | Benkley et al. |

OTHER PUBLICATIONS

U.S. Appl. No. 11/818,476, Techniques for Reducing Jitters for Taps, filed Jun. 13, 2007.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct, Manipulation," CHI '92, pp. 659-660.

International Search Report mailed Apr. 29, 2010, for PCT Application No. PCT/US2009/064273, three pages.

* cited by examiner

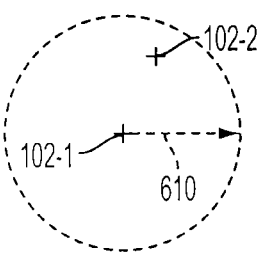 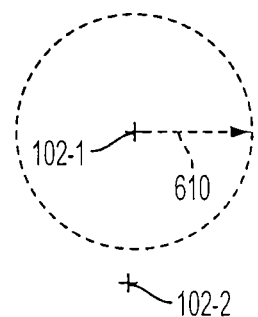
FIG. 6A  FIG. 6B
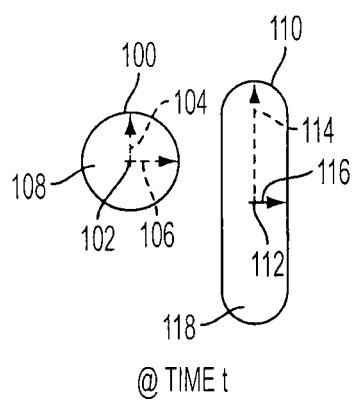 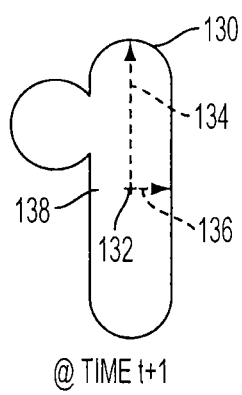
FIG. 6C
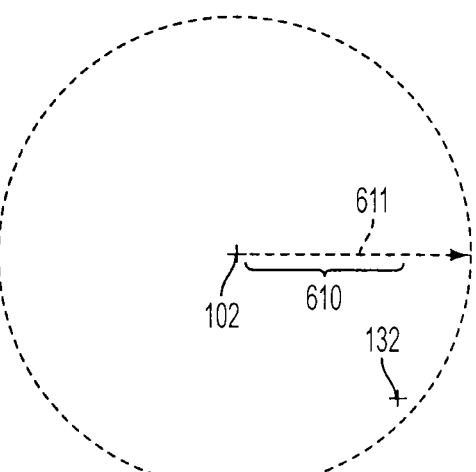
FIG. 6D  FIG. 6E

SUPPRESSING ERRANT MOTION USING INTEGRATED MOUSE AND TOUCH INFORMATION

FIELD OF THE INVENTION

This relates to a touch sensitive mouse used as an input device for a computing system and, more particularly, to methods for suppressing either errant mouse motion or errant gestures made on the mouse surface using integrated mouse and touch information.

BACKGROUND OF THE INVENTION

Most computing systems can receive input from a user via an input device such as a mouse. The mouse can allow the user to move an input pointer, e.g., a cursor, in a user interface (UI) on a display screen of the computing system and to make a selection in the UI with the pointer, thereby triggering various operations in the computing system. The mouse can include a mechanism for tracking its motion, which can be translated into signals that the computing system can use to move the input pointer in the UI. For example, an optical mouse can include a small light-emitting diode (LED), located on the underside of the mouse, to bounce light off a surface back to an optical sensor in the mouse in order to track the mouse motion. The optical sensor can send an image of "bounced-back" light to a processor in the mouse, which can determine how far the mouse has moved since the last image. The mouse processor can send the corresponding motion coordinates to the computing system. The motion of the mouse can generally correspond to the motion of the input pointer in the UI. Thus, by moving the mouse on a surface, the user can move the input pointer in similar directions in the UI. In an alternate example, a mouse trackball may be used to track the mouse motion.

The mouse can also include a mechanism for data selection in the UI. The mouse can allow the user to make a selection in the UI on the display screen by moving the pointer. For example, a touch sensitive mouse can include a touch sensor panel, which can include a panel of touch sensors and a touch sensitive surface covering a portion or substantially all of the top surface of the mouse, to make a selection. The touch sensor panel can detect a touch event and the surface location of the touch event using the touch sensors and can send the touch event information to the computing system. The computing system can interpret the touch event and thereafter perform one or more operations based on the touch event. By way of example, a data selection operation, such as a scroll operation, can be performed when a scroll motion is detected on the touch sensitive surface of the mouse. In an alternate example, a mouse scroll wheel may be used to make a selection in the UI on the display screen.

However, when moving the mouse in order to move the input pointer in the UI, it can be difficult for the user to avoid making certain finger motions on the mouse surface, which can be erroneously interpreted as an intended gesture, e.g., a scroll gesture. Conversely, when making certain robust gestures on the mouse surface, e.g., a rotate gesture, in order to cause the computing system to perform an operation, it can be difficult for the user to avoid moving the mouse, which can be erroneously interpreted as an intended mouse motion.

SUMMARY OF THE INVENTION

This relates to the suppression of errant motion regarding a mouse using integrated mouse and touch information.

In some embodiments, an errant gesture made on a surface of a touch sensitive mouse can be at least partially suppressed by taking into account mouse motion. For example, a touch event appearing to be a gesture can be detected on the mouse surface and a motion of the mouse can be determined. Mouse and touch information can be integrated such that the touch event comprising finger motions that are small relative to the mouse motion can be indicative of an errant gesture and therefore at least partially suppressed, while the touch event comprising finger motions that are large relative to the mouse motion can be indicative of an intended gesture and therefore processed.

In some embodiments, an errant mouse motion can be at least partially suppressed by taking into account a gesture detected on a surface of the mouse. For example, a touch event appearing to be a gesture can be detected on the mouse surface and a motion of the mouse can be determined. Mouse and touch information can be integrated such that the mouse motion that is small relative to the gesture motion can be indicative of errant mouse motion and therefore at least partially suppressed, while the mouse motion that is large relative to the gesture motion can be indicative of an intended mouse motion and therefore processed.

BRIEF DESCRIPTION OF THE DRAWINGS

FIG. 3b illustrates an exemplary plot of time vs. mouse filtered speed from the mouse raw speed shown in FIG. 3a.

FIG. 5b illustrates an exemplary method for calculating touch parameters used to calculate a scroll motion and to determine whether that scroll motion should be suppressed according to the exemplary method of FIG. 5a.

FIGS. 6a and 6b illustrate how touch centroid determination in a touch image can take into account system noise.

FIG. 6c illustrates exemplary merged touches as captured in a touch image.

FIGS. 6d and 6e illustrate how touch centroid determination in a touch image can take into account merged touches.

FIGS. 7b and 7c illustrate exemplary plots of time vs. mouse filtered speed associated with the mouse clicks shown in FIG. 7a.

DETAILED DESCRIPTION OF THE PREFERRED EMBODIMENTS

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to determining whether a touch event appearing to be a gesture detected on a mouse surface is errant using a method that can take into account mouse motion. A certain amount of the gesture motion can be subtracted off or canceled during a time period immediately following the detection of the touch event. Mouse and touch information can be integrated such that a touch event comprising finger motions that are small relative to the mouse motion can be indicative of errant finger motions and therefore at least partially suppressed, while a touch event comprising finger motions that are large relative to the mouse motion can be indicative of intended finger motions and therefore processed.

This further relates to determining whether a mouse motion that occurs during a touch event appearing to be a gesture detected on the mouse surface is errant using a method that can take into account the gesture motion. A certain amount of the mouse motion can be subtracted off or canceled during a time period immediately following the detection of the touch event. Mouse and touch information can be integrated such that mouse motion that is small relative to gesture motion can be indicative of errant mouse motion and therefore at least partially suppressed, while mouse motion that is large relative to gesture motion can be indicative of intended mouse motion and therefore processed.

Although some embodiments of this invention may be described herein in terms of determining an errant motion involving a touch sensitive mouse, it should be understood that embodiments of this invention are not so limited, but can generally involve any input device utilizing touch and other types of sensing technologies.

Figure 1A:
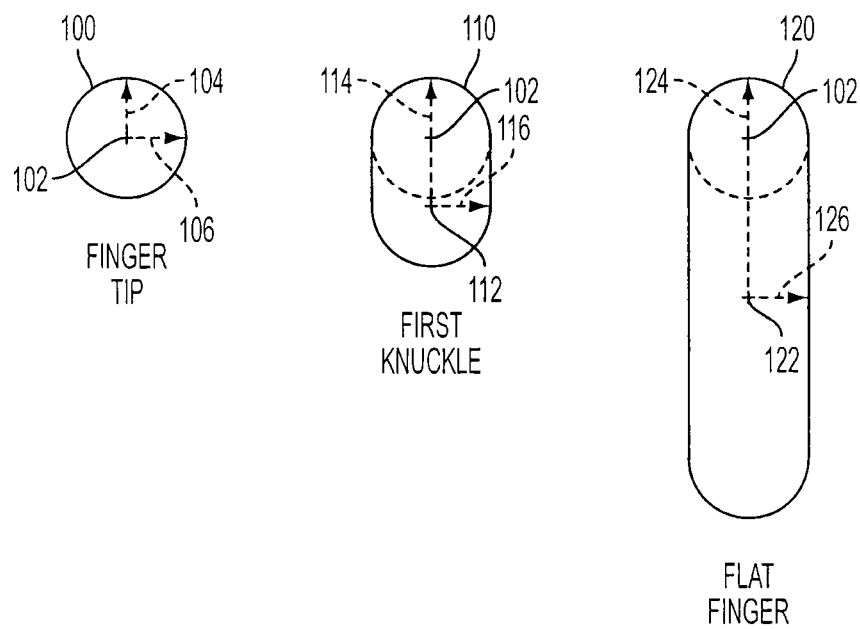
FIG. 1a illustrates exemplary touches as captured in a touch image.

FIG. 1a illustrates exemplary touches on a touch sensitive surface as captured in a touch image. Touch 100 as captured in a touch image can be defined as having centroid 102 at the center of mass of the touch with major and minor radii 104 and 106 defining the approximate boundaries of the touch area. The touch 100 can have an elliptical, almost circular, shape, where the major and minor radii 104 and 106 can be approximately the same, indicative of a detected touch of a finger tip.

Touch 110 as captured in a touch image can be defined as having centroid 112 at the center of mass of the touch with major and minor radii 114 and 116 defining the approximate boundaries of the touch area. The touch 110 can have an elliptical shape, where the major radius 114 can be longer than the minor radius 116, indicative of a detected touch of a finger from the tip to the first knuckle. The centroid 112 of the touch 110 can be lower in the y-direction than the centroid 102 of the touch 100, indicating a more elongated touch area.

Touch 120 as captured in a touch image can be defined as having centroid 122 at the center of mass of the touch with major and minor radii 124 and 126 defining the approximate boundaries of the touch area. The touch 120 can have an elongated elliptical shape, where the major radius 124 can be substantially longer than the minor radius 126, indicative of a detected touch of a flat finger encompassing substantially the entire length of the finger, e.g., from the tip to the third knuckle. The centroid 122 of the touch 120 can be lower in the y-direction than the centroid 112 of the touch 110 and substantially lower in the y-direction than the centroid 102 of the touch 100, indicating a more elongated touch area.

Figure 1B:
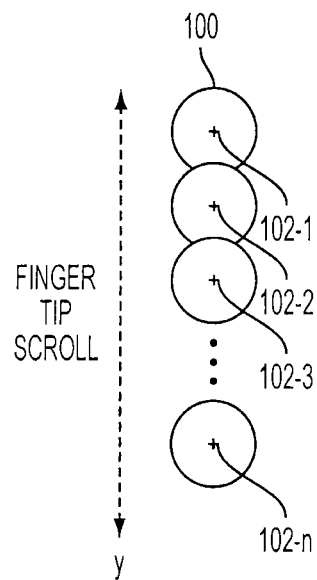
FIG. 1b illustrates an exemplary finger path for a scroll motion as captured in a plurality of touch images.

FIG. 1b illustrates an exemplary finger path for a scroll motion. A scroll motion can involve a finger tip moving up or down substantially in the y-direction relative to a touch sensitive surface. At the start of the scroll motion when the finger tip first touches the touch sensitive surface, touch 100 can be detected at time t and defined in a touch image by centroid 102-1 having touch image coordinates $(x_1, y_1)$. As the scroll motion continues with the finger tip moving in the y-direction on the touch sensitive surface, the touch 100 can be detected at time t+1 and defined in a touch image by centroid 102-2 having touch image coordinates $(x_2, y_2)$, detected at time t+2 and defined in a touch image by centroid 102-3 having touch image coordinates $(x_3, y_3)$, and so on. At the end of the scroll motion just before the finger tip lifts off the touch sensitive surface, the touch 100 can be detected at time t+n and defined in a touch image by centroid 102-$n$ having touch image coordinates $(x_n, y_n)$, where n is an integer.

Generally, a scroll motion can include motion in both the x- and y-directions on the touch sensitive surface since a user cannot move a finger in an absolute straight line. However, motion in one direction can be significantly greater than motion in the other. For example, as shown in FIG. 1b, the differences between image coordinates $y_1, y_2, \ldots, y_n$ can be significantly greater than the differences between image coordinates $x_1, x_2, \ldots, x_n$ because the scroll motion is in substantially the y-direction. Accordingly, in some embodiments, the coordinates in the direction indicating little motion, e.g., the x-coordinates in FIG. 1b, can be ignored. In some embodiments, the coordinates in the direction indicating little motion, e.g., the x-coordinates in FIG. 1b, can be monitored. And if the coordinates subsequently indicate increased motion in that direction, the computing system can consider the touch event no longer a scroll motion, but another type of motion, and respond accordingly.

For simplicity, embodiments of the invention describe the scroll motion in terms of a substantially downward y-direction on the touch sensitive surface, which can correspond to change in primarily the y-coordinate of the touch image. However, it is to be understood that the scroll motion is not limited to a substantially downward y-direction on the touch sensitive surface, but may alternatively be in a substantially upward y-direction or in a substantially x-direction.

Figure 2:
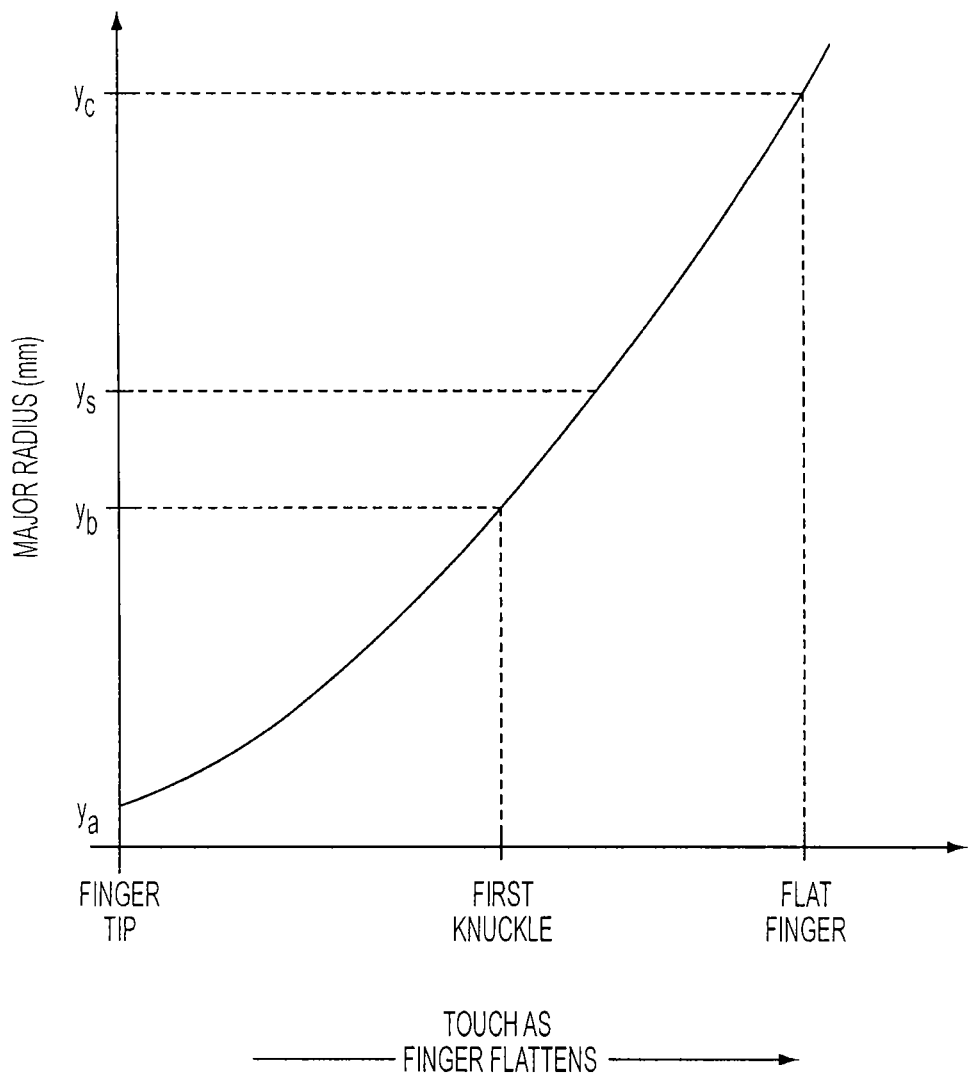
FIG. 2 illustrates an exemplary plot of touch vs. major radius of elliptical touches of an increasingly flattened finger.

FIG. 2 illustrates an exemplary plot of touch vs. major radii for the elliptical touches of an increasingly flattened finger, e.g., as shown in FIG. 1a. A finger tip touch can have a small major radius of $y_a$ mm. In some embodiments, a typical major radius $y_a$ for a finger tip can be approximately 7 mm. A touch of a finger from tip to first knuckle can have a slightly longer major radius of $y_b$ mm. In some embodiments, a typical major radius $y_b$ for a finger from tip to first knuckle can be approximately 17 mm. A touch of a flat finger can have a significantly longer major radius of $y_c$ mm. In some embodiments, a typical major radius $y_c$ for a flat finger can be approximately 40 mm.

As illustrated by the touches in FIG. 1a, the centroid of a finger touch in a touch image can change in the y-coordinate and remain relatively stationary in the x-coordinate as the finger flattens on a touch sensitive surface. As illustrated by the finger path in FIG. 1b, the centroid of a finger touch in a plurality of touch images can similarly change in the y-coordinate and remain relatively stationary in the x-coordinate as the finger tip performs the scroll motion on the touch sensitive surface. By tracking the centroid alone, it can be difficult to distinguish between a flattening motion as in FIG. 1a and a scroll motion as in FIG. 1b.

Therefore, to distinguish between a flattening motion and a scroll motion, the front edge of the elliptical touch (corresponding to the very tip of the finger) can be used. The very tip of the finger may move very little as the finger flattens out on the surface. Therefore, the front edge of the elliptical touch may not change in the y-coordinate of the touch image as the finger flattens. Conversely, the very tip of the finger may move noticeably as the finger performs the scroll motion on the surface. Therefore, the front edge of the elliptical touch may change in the y-coordinate of the touch image as the finger performs the scroll motion. The front edge of the elliptical touch can be calculated for the y-coordinate (y') in the touch image as follows:

$$y' = y + (r - r_d)K, \tag{1}$$

where y is the y-coordinate in the touch image for the centroid of the touch, r is the major radius of the touch, $r_d$ is the major radius of a finger tip, K is an offset gain, and $(r-r_d)K$ is an offset in the y-direction from the centroid to the front edge of the elliptical touch. In some embodiments, K can be empirically determined preferably to range between about 50% and about 100% and more preferably to be at about 80%. K greater than 100% can tend to overshoot the finger tip, while K less than 50% can tend to undershoot the tip. In some embodiments, $r_d$ can be 7 mm.

Accordingly, as a detected touch becomes more like a finger tip touch, the offset can approach zero and y' can approach y. Conversely, as a detected touch becomes more like a flat finger touch, the offset can increase toward a maximum and y' can move away from y.

Referring again to FIG. 2, $y_s$ can define a saturation major radius. As a finger flattens and its corresponding touch in the touch image increases in size, noise in the image can make it difficult to accurately determine a value for the major radius. Hence, the offset calculation (Equation (1)) can become unstable, causing the calculated y' to bounce around a great deal over time. This instability point can most likely occur after the finger flattens to the first knuckle (having major radius $y_b$) and before the finger fully flattens (having major radius $y_c$), where the touch area increases quite rapidly, as shown in FIG. 2. This instability point can be deemed the saturation point of the touches having saturation major radius $y_s$, where $y_b < y_s < y_c$. In some embodiments, the saturation major radius $y_s$ can be approximately 20 mm. Therefore, touches with major radii above 20 mm can use 20 mm as the major radius r in Equation (1) above.

The instantaneous scroll motion s(t) at time t can be calculated as follows:

$$s(t) = y'(t) - y'(t-1), \tag{2}$$

where y' is the y-coordinate in the touch image of the front edge of the elliptical touch as calculated above in Equation (1). Accordingly, the amount of scroll made between time t and preceding time t-1 can be calculated.

The instantaneous scroll motion s(t) integrated over a time period from time $t_0$ (the time that the scroll motion began) to time t can determine the accumulated scroll motion S(t) at time t as follows:

$$S(t) = \sum_{t_o}^{t} s(t), \tag{3}$$

where s(t) is the instantaneous scroll motion over time calculated above in Equation (2).

Figure 3A:
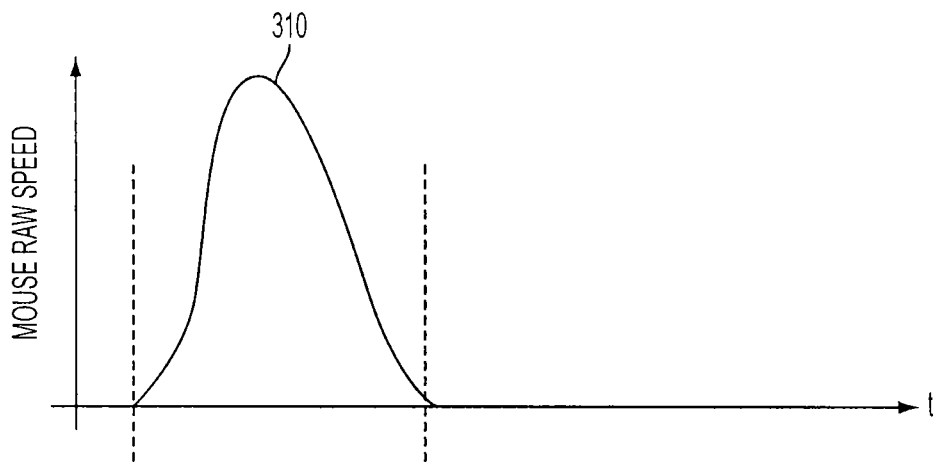
FIG. 3a illustrates an exemplary plot of time vs. mouse raw speed.

FIG. 3a illustrates an exemplary plot of time vs. mouse raw speed. Bump 310 in FIG. 3a can be caused by a mouse motion, which can produce a sharp rise in the mouse's speed as it starts moving, a peak when the mouse reaches its maximum speed, and a sharp fall in the mouse's speed as it stops moving. The total mouse raw speed v(t) at time t can be calculated from the mouse optical sensor, which can sense the $(x_m, y_m)$ coordinates of the mouse as it moves, as follows:

$$v(t) = \sqrt{(\Delta x_m)^2 + (\Delta y_m)^2}, \tag{4}$$

where $$\Delta x_m = x_m(t) - x_m(t-1), \tag{5}$$

$$\Delta y_m = y_m(t) - y_m(t-1), \tag{6}$$

where $\Delta x_m$ is the change in the mouse x-coordinate $x_m$ from time t-1 to time t and $\Delta y_m$ is the change in the mouse y-coordinate $y_m$ from time t-1 to time t.

The mouse raw speed $v_x(t)$ in the x-direction at time t can be calculated as follows:

$$v_x(t) = |\Delta x_m|. \tag{7}$$

Similarly, the mouse raw speed $v_y(t)$ in the y-direction at time t can be calculated as follows:

$$v_y(t) = |\Delta y_m|. \tag{8}$$

Alternatively, the total mouse raw speed v(t) at time t can be calculated as follows:

$$v(t) = |v_x(t)| + |v_y(t)|. \tag{9}$$

More generally, the total mouse raw speed can be calculated as any combination of the x-direction and the y-direction mouse raw speeds. The total mouse raw speed, the x-direction mouse raw speed, or the y-direction mouse raw speed can be used according to embodiments of the invention.

It is to be understood that the mouse is not limited to optical sensors for determining mouse speed, but can use a trackball, an accelerometer, a gyroscope, and other such devices capable of determining mouse speed.

Figure 3B:
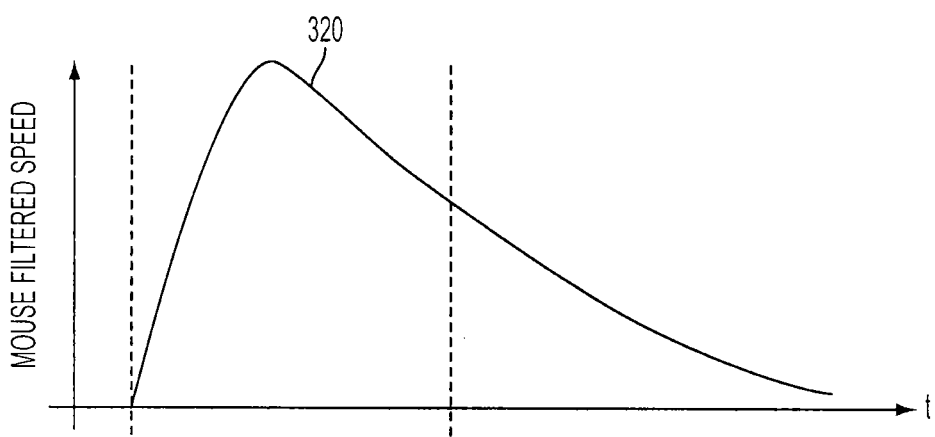

FIG. 3b illustrates an exemplary plot of time vs. mouse filtered speed from the mouse raw speed of FIG. 3a. Bump 320 in FIG. 3b can be caused by applying a simple first-order autoregressive filter to the mouse raw speed illustrated by bump 310 in FIG. 3a, which can produce faster buildup of the filtered speed as the mouse starts moving and slower decay of the filtered speed as the mouse stops moving. The filter can be applied to the total mouse raw speed or to the x-direction mouse raw speed and the y-direction mouse raw speed together or separately. The mouse filtered speed $v_f(t)$ at time t can be calculated as follows:

$$v_f(t) = (1-\alpha)v(t) + \alpha v_f(t-1), \tag{10}$$

where α is a filter factor. In some embodiments, α=0.5, for v(t)>v_f(t−1), and α=0.95, otherwise. Accordingly, when the mouse moves faster at time t than at preceding times, the filter having α at 0.5 can rely on the current raw speed to help buildup faster. However, when the mouse moves slower at time t than at preceding times, the filter having α at 0.95 can rely more heavily of the previous filtered speed to help decay slower. By building up the filtered speed faster, the filtered speed can be available more quickly for comparison to scroll motion to determine whether the scroll motion is errant and should be suppressed. By decaying the filtered speed more slowly, the filtered speed can continue to suppress errant scroll for some time after mouse motion has stopped should there be residual errant scroll motion. This will be discussed in more detail below in FIG. 4.

An errant scroll motion can be suppressed by adjusting the accumulated scroll motion S(t) at time t by an amount proportional to the mouse filtered speed $v_f(t)$ at time t as follows:

$$S(t) = S(t) - Gv_f(t) \text{ if } S(t) > Gv_f(t), \text{ or} \quad (11)$$
$$= S(t) + Gv_f(t) \text{ if } S(t) < -Gv_f(t), \text{ or}$$
$$= 0,$$

where G is the proportional gain and $Gv_f(t)$ is a proportional amount of the mouse filtered speed that the accumulated scroll motion can exceed in order to be considered a true scroll motion and not errant. Accordingly, the correlative effect between the mouse motion and the scroll motion can be as follows. A larger mouse motion can suppress at least a portion of the scroll motion because it is less likely that a user is scrolling at the same time that the user is moving the mouse. In contrast, a smaller mouse motion can allow the scroll motion because it is more likely that a user is scrolling when the mouse is either not moving or moving very little.

Figure 4:
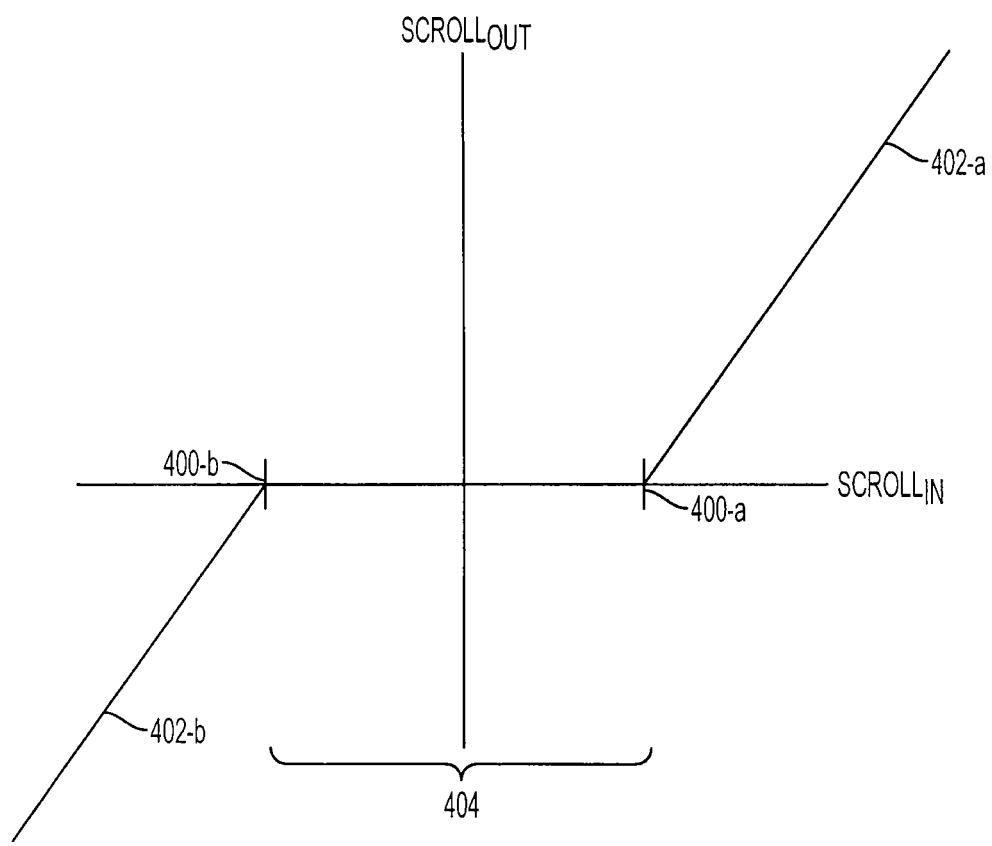
FIG. 4 illustrates an exemplary plot of an input (scroll$_{IN}$) vs. an output (scroll$_{OUT}$), wherein the plot represents a scroll suppression function at a particular moment in time according to embodiments of the invention.

FIG. 4 illustrates an exemplary plot of an input of accumulated scroll motion (scroll_IN) vs. an output of accumulated scroll motion (scroll_OUT), wherein the plot can represent the scroll suppression function described above (Equation (11)) at a particular moment in time according to embodiments of the invention. There can be a "dead" zone 404 on either side of the scroll_OUT y-axis in which S(t) can be held at zero (maximum scroll suppression) to ignore a scroll motion as errant. The boundaries of the dead zone 400-a and 400-b can be where |S(t)|=Gv_f(t). Outside of the dead zone 404, on either side, the plots can resume a linear function 402-a and 402-b. Therefore, just outside the dead zone 404, a particular value for scroll_IN can yield a small scroll_OUT, indicating that a large amount of scroll suppression is still occurring. However, as scroll_IN gets large, scroll_OUT can approach scroll_IN, at least on a percentage basis, indicating an ever-decreasing scroll suppression. Accordingly, the plot illustrates that, the larger the scroll motion relative to the mouse motion, the more likely it is that the scroll motion is a true scroll motion and not errant.

In some embodiments, the instantaneous scroll motion s(t), rather than the accumulated scroll motion S(t), at time t can be adjusted by an amount proportional to the mouse filtered speed $v_f(t)$ at time t, as in Equation (11).

In some embodiments, the y-coordinate in the touch image of the front edge of the elliptical touch, y'(t), rather than the accumulated scroll motion S(t), at time t can be adjusted by an amount proportional to the mouse filtered speed $v_f(t)$ at time t, as in Equation (11).

Figure 5A:
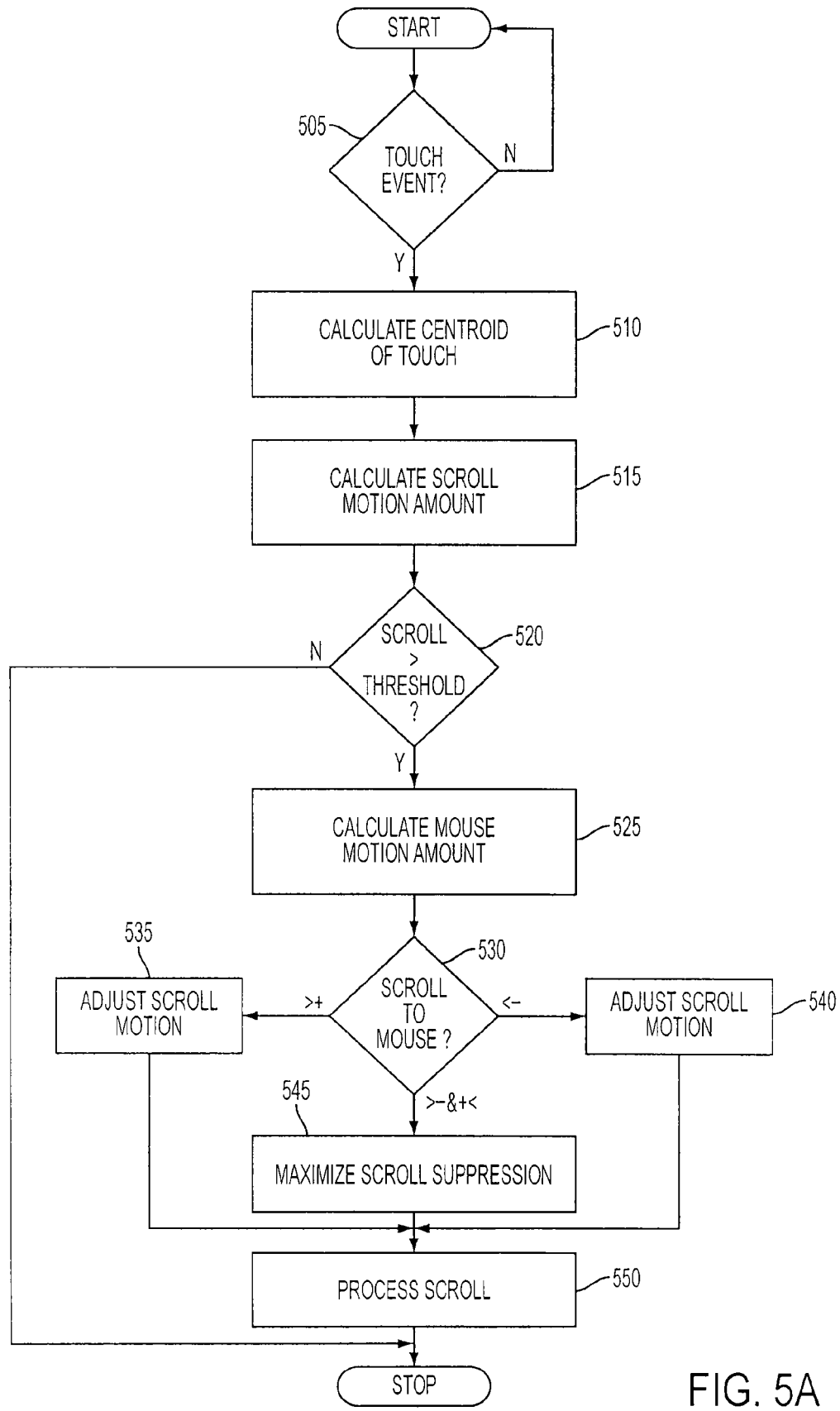
FIG. 5a illustrates an exemplary method for suppressing an errant scroll motion in a detected touch on a mouse surface using a mouse motion according to embodiments of the invention.

FIG. 5a illustrates an exemplary method for suppressing an errant scroll motion in a detected touch on a mouse surface using a mouse motion according to embodiments of the invention. A determination can be made whether a touch event has been detected on a touch sensitive surface of a mouse (505). The touch event can be captured as one or more touch images over time, representing the pattern of the fingers touching the surface. If a touch event has been detected, a centroid for an elliptical touch captured in the touch image(s) can be determined using standard signal processing techniques (510). Major and minor radii and total signal area for the elliptical touch in the touch image(s) can also be determined using standard signal processing techniques. The front edge coordinates of the elliptical touch can be calculated as in Equation (1).

The instantaneous scroll motion between consecutive touch images comprising the touch event can be calculated using the determined centroids, as in Equation (2), and integrated over a time period from time $t_0$ to time t, as in Equation (3), to get the accumulated scroll motion at time t (515).

The accumulated scroll motion at time t can be compared to an initial scroll motion threshold (520). If the accumulated scroll motion is less than the threshold, the touch event can be deemed not to be a scroll motion and the method can stop.

If, however, the accumulated scroll motion at time t is greater than the threshold, the mouse motion at time t can be calculated (525). The mouse raw speed at time t can be calculated, as in Equations (4)-(9). The mouse raw speed can be filtered using a filter, as in Equation (10), to produce the mouse filtered speed at time t.

As in Equation (11), the calculated accumulated scroll motion at time t can be compared to the calculated mouse filtered speed at time t (530). If the scroll motion has a positive value and is greater than a positive proportional amount of mouse speed, the proportional amount can be subtracted from the scroll motion to obtain a modified scroll motion for the detected touch taking into account the mouse speed (535). Alternatively, if the scroll motion has a negative value and is less than a negative proportional amount of mouse speed, the proportional amount can be added to the scroll motion to obtain a modified scroll motion for the detected touch taking into account the mouse speed (540). Otherwise, the scroll motion can be set to zero to obtain maximum scroll motion suppression for the detected touch taking into account the mouse speed (545).

The resulting scroll motion can be processed to trigger a scroll operation by a computing system (550).

Figure 5B:
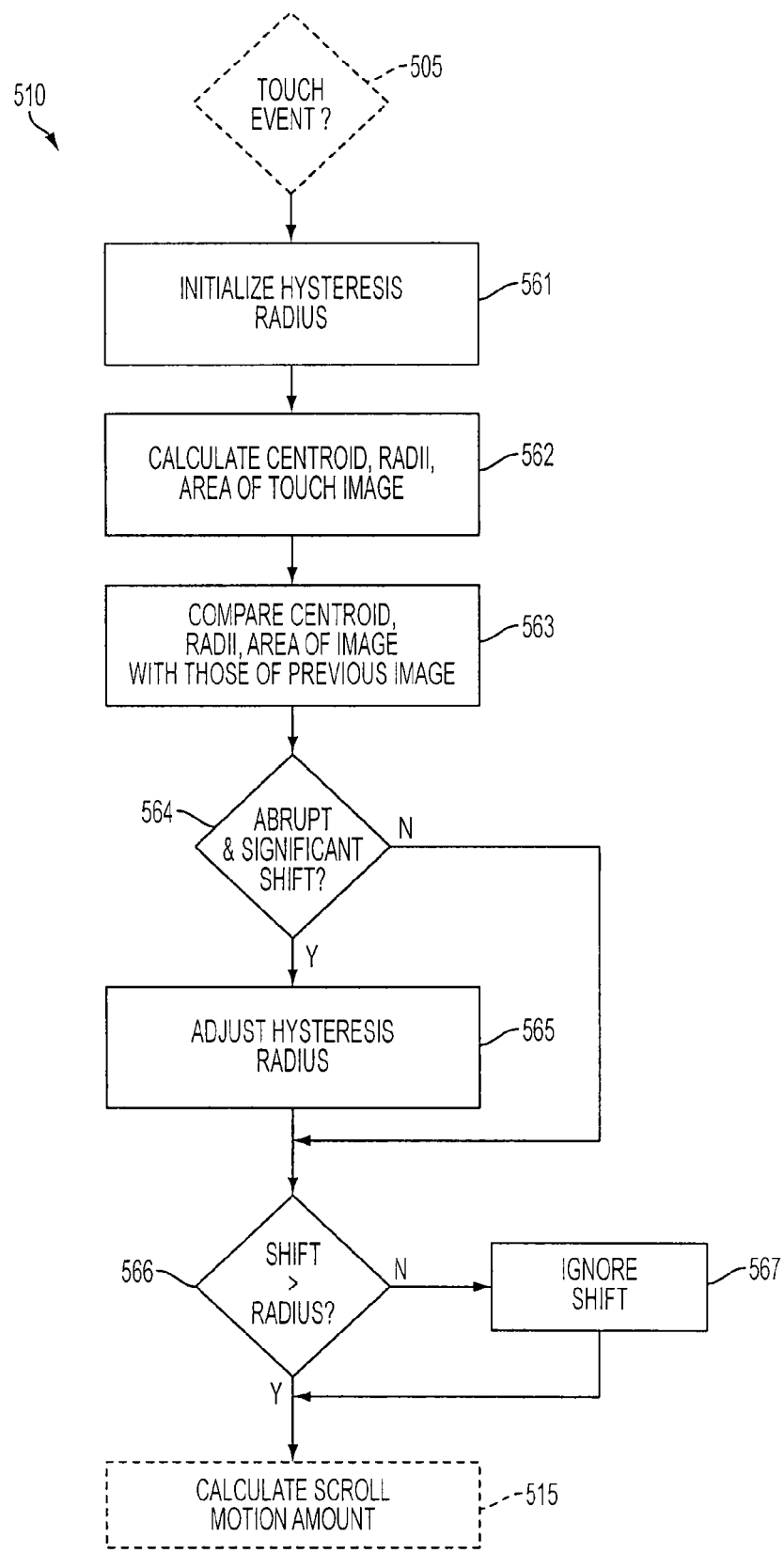

FIG. 5b illustrates an exemplary method for calculating a centroid used to determine scroll motion in the method of FIG. 5a by taking into account system noise and inadvertently merged touches in a touch image as described in FIGS. 6a through 6e. This method will be described in more detail below.

FIGS. 6a and 6b illustrate how touch centroid determination in a touch image can take into account system noise. Due to system noise, the centroid location of a finger touch in consecutive touch images can shift by one or two pixels even though the finger touch captured by the touch images has not moved, such that the shift can erroneously be interpreted as a scroll motion and cause scroll jitter. For example, in FIG. 6a, centroid 102-1 of a touch in a touch image at time t can have one location, whereas centroid 102-2 of the touch in a touch image at time t+1 can have another location even though the finger touch captured in the touch images has not moved. To prevent this adverse noise effect, hysteresis radius 610 can be established at the centroid location of the touch in the first image, e.g., centroid 102-1 of the touch in the touch image at time t, to ignore any centroid movement in subsequent touch images that falls within the circle defined by the hysteresis radius. Consequently, the movement of centroid 102-2 in FIG. 6a can be ignored and centroid 102-1 considered the correct centroid. The ignored centroid at time t+1 can be replaced with the correct centroid at time t as follows:

$$(x(t+1), y(t+1))=(x(t), y(t)). \qquad (12)$$

The centroid replacement of Equation (12) can be repeated for subsequently ignored centroids until such time as the centroid location is outside the circle defined by the hysteresis radius 610, indicative of a true finger movement.

In some embodiments, hysteresis radius 610 can be three pixels wide, which can be considered sufficient for suppressing scroll jitter caused by system noise.

An intended (or true) scroll motion can cause centroid movement greater than that caused by noise, e.g., greater than three pixels. For example, in FIG. 6b, where there has been a true scroll motion, centroid 102-1 of a touch in a touch image at time t can have one location and centroid 102-2 of the touch in a touch image at time t+1 can have another location. Since centroid 102-2 is located outside the circle defined by hysteresis radius 610, the centroid's location can be used to determine the scroll motion.

The methodology illustrated in FIGS. 6a and 6b can be sufficient for suppressing scroll jitter caused by system noise, but it may not be sufficient for centroid movement caused by erroneously merged touches in a touch image, which can cause centroid movement ranging from 3 to 100 pixels. In other words, the centroid in a touch image of merged touches can exceed the boundary of the circle defined by the hysteresis radius and, thus, can erroneously be interpreted as a scroll motion.

FIG. 6c illustrates exemplary merged touches captured in a touch image. In the example of FIG. 6c, multiple fingers can touch a touch sensitive surface at the same time. For example, during a scroll motion, it is not uncommon for one finger to perform the scroll motion while the adjacent finger rests on the mouse surface. In FIG. 6c, a touch image at time t can have a finger tip touch 100 and a finger touch from tip to first knuckle 110. The touches 100 and 110 can form separate ellipses defined by separate centroids 102 and 112, major radii 104 and 114, minor radii 106 and 116, and total signal areas 108 and 118, respectively, in the touch image.

Due to their proximity, the two fingers can inadvertently touch or near touch at time t+1, causing their touches 100 and 110 to be captured in a touch image at time t+1 as merged touch 130. The merged touch 130 can be defined as having centroid 132 at the center of mass of the touch with major and minor radii 134 and 136 defining the approximate boundaries of the touch area. The merged touch 130 can have an irregular elliptic-like shape, where the major radius 134 can be longer than the minor radius 136. In the merged touch 130 of FIG. 6c, the centroid 132 has abruptly and significantly shifted away from the locations of either centroid 102 or centroid 112, the major and minor radii 134 and 136 have abruptly and significantly shifted to different lengths from either major and minor radii 104 and 106 or major and minor radii 114 and 116, and the total signal area 138 has abruptly and significantly increased over either area 108 or area 118.

FIGS. 6d and 6e illustrate how touch centroid determination in a touch image can take into account merged touches, e.g., as shown in FIG. 6c. Due to a merge, the centroid location of touches in consecutive touch images can abruptly shift by typically 3 to 100 pixels even though the finger touches captured in the images have not moved that much, such that the shift can erroneously be interpreted as a scroll motion and cause scroll jitter. For example, in FIG. 6d, centroid 102 of the finger tip touch 100 in a touch image at time t can have one location, whereas centroid 132 of the merged touch 130 in a touch image at time t+1 can have another location even though the finger tip touch has not moved that much. However, since centroid 132 is outside the boundaries of the circle defined by hysteresis radius 610, centroid 132 can be considered a movement and erroneously interpreted as a scroll motion made by the finger tip.

To prevent this adverse merge effect, the hysteresis radius can be increased when abrupt and significant shifts in the centroid location of touches in consecutive touch images are determined, indicative of a merged touch. The hysteresis radius can be increased enough to encompass the centroid of the merged touch. Alternatively, the hysteresis radius can be increased when abrupt and significant changes in the lengths of the minor axes of touches in consecutive touch images are determined, also indicative of a merged touch. Alternatively, the hysteresis radius can be increased when abrupt and significant changes in the total signal area in consecutive touch images are determined, also indicative of a merged touch.

For example, in FIG. 6e, hysteresis radius 610 can be extended from the centroid location of the finger tip touch in the first touch image, e.g., centroid 102 of the touch 100 in a touch image at time t, to hysteresis radius 611 so as to ignore any centroid movement in subsequent images that falls within the circle defined by the hysteresis radius 611. Consequently, the centroid 132 in FIG. 6d can be ignored and centroid 102 considered the correct centroid for the finger tip touch 100, as in Equation (12), until such time as the merged touch has correctly separated into single touches in subsequent images.

In some embodiments, hysteresis radius 611 can be 100 pixels wide, which can be considered sufficient for suppressing scroll jitter caused by merged touches.

In some embodiments, hysteresis radius 611 can be dynamically adjusted based on various factors. For example, the hysteresis radius 611 can be adjusted based on the length of time that the finger touch has been detected. Generally, the longer the finger touch is detected, the more stable the touch image and, hence, the more stable the centroid. As such, the hysteresis radius 611 can be increased initially when the finger touches and decreased as the time the finger touches lengthens. By way of example, a finger touch can stabilize in approximately 25 ms to provide an appropriately stable centroid. The hysteresis radius 611 can also be determined based on how much the centroid, the minor radius, and/or the total signal area shifted and increased by those amounts.

As shown in FIG. 5a, after a touch event has been detected, a centroid of an elliptical touch captured in a touch image can be determined. Referring again to FIG. 5b, the centroid can be determined taking into account system noise and merged touches as follows. An initial hysteresis radius can be established (561). The centroid, major and minor radii, and total signal area of each touch in a touch image can be determined using standard signal processing techniques (562). For consecutive touch images, the respective determined centroids, radii, and areas can be compared (563). A determination can be made whether there is an abrupt and significant shift in one or more of these parameters between the consecutive images, indicative of an erroneous merging of touches in the later image (564). If so, the hysteresis radius can be increased to encompass the centroid of the merged touches within the circle defined by the increased radius, as illustrated in FIG. 6e (565). If there is not an abrupt and significant shift, the hysteresis radius can remain at its previous value.

The shift in the centroid, radii, and/or area can be compared to the hysteresis radius, either the previous radius or the increased radius (566). If the shift positions the centroid within the circle defined by the hysteresis radius, then the shift can be ignored as either system noise (if the previous radius was used) or merged touches (if the increased radius was used) (567). If the shift is ignored, the centroid of the touch in the current touch image can be replaced with the centroids of the respective touches of the previous touch image, as in Equation (12). The front edge coordinates of the touches in a touch image can be calculated as in Equation (1), based on the determined centroids.

If the shift positions the centroid outside the circle defined by the hysteresis radius, then the shift can be considered a true finger movement to be used to determine scroll motion (515). The front edge coordinates of the touches in a touch image can be calculated as in Equation (1).

Although some embodiments of the invention may describe herein the hysteresis radius for minimizing the adverse effects of system noise and/or merged touches in a touch image, it should be understood that embodiments of the invention are not so limited, but may generally apply any filtering or squelching methodology capable of minimizing these and other such adverse effects.

It is to be understood that the scroll suppression methods are not limited to those described herein, but may include additional or other steps capable of suppression errant scroll motion according to embodiments of the invention.

Figure 7A:
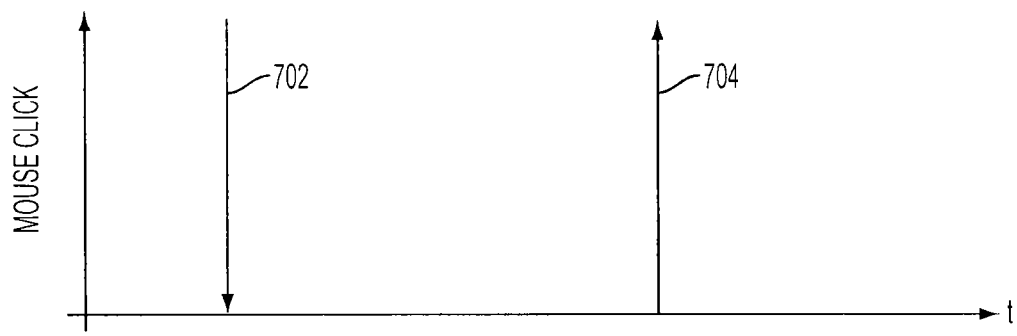
FIG. 7a illustrates an exemplary plot of time vs. mouse click.

FIG. 7*a* illustrates an exemplary plot of time vs. mouse click. Pulse 702 in FIG. 7*a* can be caused by a mouse down click, which can produce an impulse when the mouse is clicked. Pulse 704 in FIG. 7*a* can be caused by a mouse up click, which can produce an impulse when the mouse is clicked. When a user clicks the mouse, the user can make an errant scroll motion at the same time. Accordingly, scroll suppression can be used with mouse clicks. Since a user generally does not move the mouse at the same time that the user performs a mouse click, actual mouse motion may not be sufficient to compare to scroll motion for suppressing the scroll motion. As such, for mouse clicks, an artificial mouse motion may be created to compare to scroll motion in order to suppressing errant scroll motion according to embodiments of the invention.

Figure 7B:
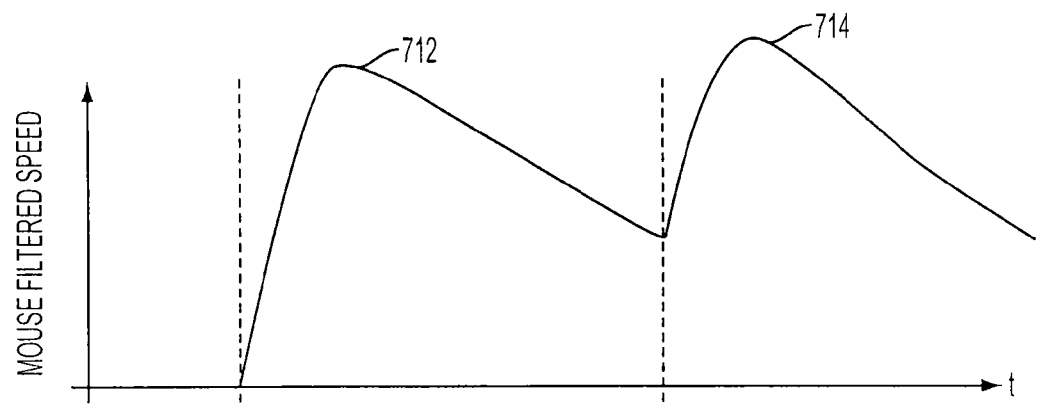
Figure 7C:
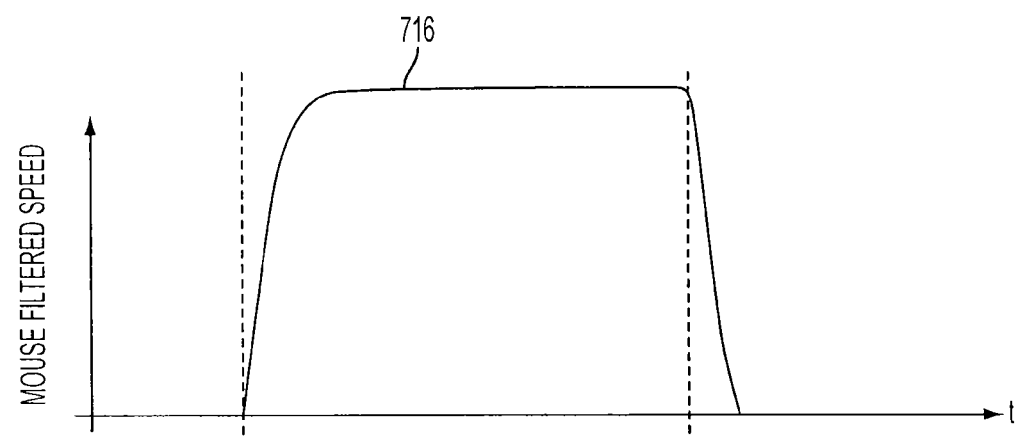

FIGS. 7*b* and 7*c* illustrate exemplary plots of time vs. mouse filtered speed associated with the mouse clicks of FIG. 7*a*. When the mouse clicks, a mouse filtered speed $v_f(t)$ at time t can be artificially created as follows:

$$v_f(t) = M, \quad (13)$$

where M is a speed constant. In some embodiments, M=100. Thereafter, the filter of Equation (10) can be applied to determine mouse filtered speed $v_f(t)$ with mouse raw speed $v(t)=0$.

In the example of FIG. 7*b*, bump 712 can be caused by applying the filter of Equation (10) to the mouse click illustrated by pulse 702 in FIG. 7*a*, which can produce faster buildup of the filtered speed as the mouse clicks and slower decay of the filtered speed after the click. Accordingly, when the mouse clicks at time t, the filter can set an artificial filtered speed (as in Equation (13)) associated with the click to help buildup faster. Whereas, after the click, the filter can rely on the previous filtered speed to help decay slower. By building up the filtered speed faster, the filtered speed can be available more quickly for comparison to scroll motion to determine whether the scroll motion is errant and should be suppressed. By decaying the filtered speed more slowly, the filtered speed can continue to suppress errant scroll for some time after the mouse click should there be residual errant scroll motion. Bump 714 can be caused by applying the filter of Equation (10) to the mouse click illustrated by pulse 704 in FIG. 7*a*, which can produce faster buildup of the filtered speed as the mouse clicks and slower decay of the filtered speed after the click. Accordingly, when the mouse clicks, the filter can reset to the artificial filtered speed (as in Equation (13)) associated with the click to help buildup faster. Whereas, after the click, the filter can rely on the previous filtered speed to help decay slower.

In the example of FIG. 7*c*, bump 716 can be caused by setting an artificial filtered speed (as in Equation (13)) associated with the down click, maintaining the filtered speed until the next click, and setting the filtered speed to zero associated with the up click. The filtered speed can be available for comparison to scroll motion to determine whether the scroll motion is errant and should be suppressed. By maintaining the filtered speed after the down click, the filtered speed can continue to suppress errant scroll for some time should there be residual errant scroll motion.

It is to be understood that errant scroll motion suppression is not limited to the mouse events described above, but can be used with any mouse events where it is possible to make an errant scroll motion. For example, in some embodiments, errant scroll motion suppression can be used when a mouse is touched after it has been untouched for a long period of time, i.e., woke up. In some embodiments, errant scroll suppression can be used when a mouse is lifted.

Figure 8:
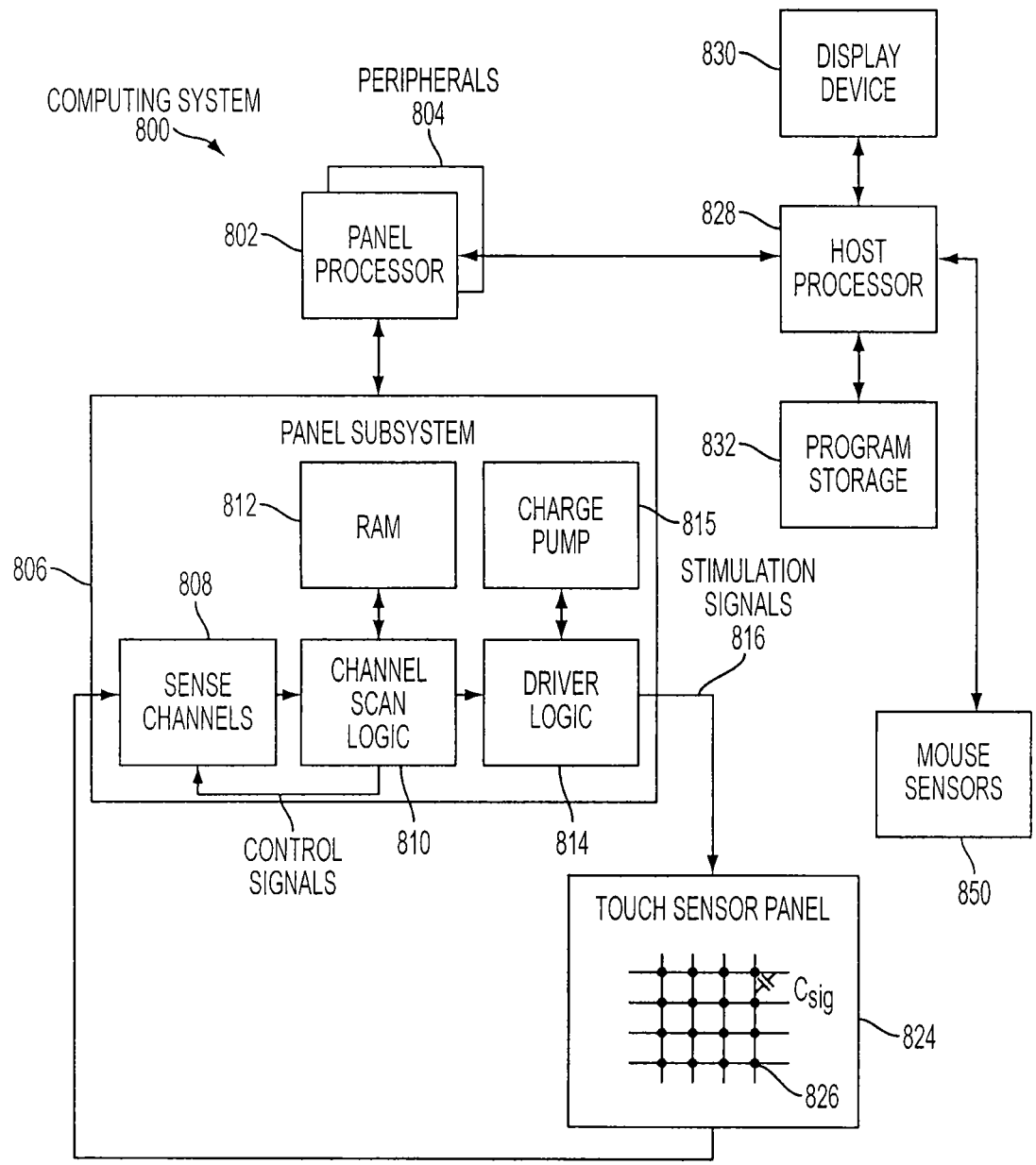
FIG. 8 illustrates an exemplary computing system implementing the algorithm for suppressing an errant motion using integrated mouse and touch information according to embodiments of the invention.

FIG. 8 illustrates an exemplary computing system implementing the algorithm for suppressing errant motion according to embodiments of the invention. In the example of FIG. 8, computing system 800 can include one or more panel processors 802, which can execute software or firmware implementing the algorithm for suppressing errant motion according to embodiments of the invention, and peripherals 804, and panel subsystem 806. Peripherals 804 can include, but are not limited to, random access memory (RAM) or other types of memory or storage, watchdog timers and the like. Panel subsystem 806 can include, but is not limited to, one or more sense channels 808, channel scan logic (analog or digital) 810 and driver logic (analog or digital) 814. Channel scan logic 810 can access RAM 812, autonomously read data from sense channels 808 and provide control for the sense channels. In addition, channel scan logic 810 can control driver logic 814 to generate stimulation signals 816 at various phases that can be simultaneously applied to drive lines of touch sensor panel 824. Panel subsystem 806 can operate at a low digital logic voltage level (e.g. 1.7 to 3.3V). Driver logic 814 can generate a supply voltage greater that the digital logic level supply voltages by cascading two charge storage devices, e.g., capacitors, together to form charge pump 815. Charge pump 815 can be used to generate stimulation signals 816 that can have amplitudes of about twice the digital logic level supply voltages (e.g. 3.4 to 6.6V). Although FIG. 8 shows charge pump 815 separate from driver logic 814, the charge pump can be part of the driver logic. In some embodiments, panel subsystem 806, panel processor 802 and peripherals 804 can be integrated into a single application specific integrated circuit (ASIC).

Touch sensor panel 824 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 826, which can be particularly useful when touch sensor panel 824 is viewed as capturing an "image" of touch. (In other words, after panel subsystem 806 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between the drive and sense lines and local system ground appears as a stray capacitance Cstray and the capacitance at the intersections of the drive and sense lines, i.e., the pixels, as a mutual signal capacitance Csig when the given drive line is stimulated with an alternating current (AC) signal. The presence of a finger or other object near or on the touch sensor panel can be detected by measuring changes to a signal charge present at the pixels being touched, which is a function of Csig. Each sense line of touch sensor panel 824 can drive sense channel 808 in panel subsystem 806.

Touch sensor panel 824 can cover a portion or substantially all of a surface of an input device, such as a mouse.

Computing system 800 can also include host processor 828 for receiving outputs from panel processor 802 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 828 can execute software or firmware implementing the algorithm for suppressing errant motion according to embodiments of the invention. Host processor 828 can also perform additional functions that may not be related to panel processing, and can be coupled to program storage 832 and display device 830 such as an LCD display for providing a UI to a user of the device. Display device 830 together with touch sensor panel 824, when located partially or entirely under the touch sensor panel, can form a touch screen.

Mouse sensors 850 can detect certain mouse events and transmit those events to host processor 828 to be used for suppressing errant motion according to embodiments of the invention. For example, mouse sensors 850 can include mouse motion sensors to detect motion of the mouse and transmit that motion to host processor 828 to be used for suppressing errant motion. Additionally, mouse sensors 850 can include mouse click detectors to detect a mouse click and transmit that click to host processor 828 to be used for suppressing errant motion.

Note that one or more of the functions described above can be performed by firmware stored in memory (e.g. one of the peripherals 804 in FIG. 8) and executed by panel processor 802, or stored in program storage 832 and executed by host processor 828. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the sensor panel is not limited to a touch sensor panel, as described in FIG. 8, but may be a proximity sensor panel or any other sensor panel capable of sensing a touch or hover event and suppressing errant motion according to embodiments of the invention. Furthermore, although the touch sensors in the touch sensor panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel.

Figure 9:
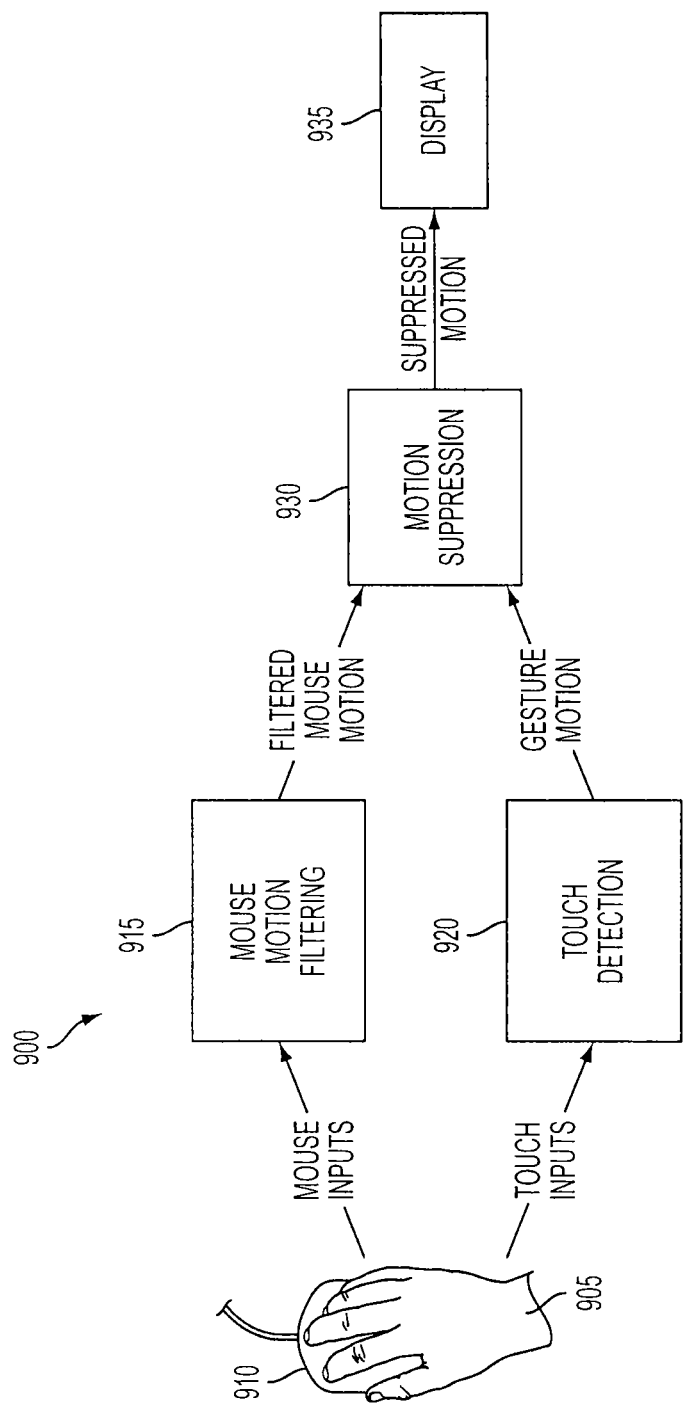
FIG. 9 illustrates exemplary software blocks which can include errant motion suppression algorithms and which can be executed by the computing system of FIG. 8 according to embodiments of the invention.

FIG. 9 illustrates exemplary software blocks which can include errant motion suppression algorithms described herein and which can be executed by the computing system of FIG. 8 according to embodiments of the invention. In the example of FIG. 9, touch sensitive mouse 910 can be contacted by user's hand 905 to cause some mouse event and/or make some gesture on the mouse surface. Data generated by the mouse event can be inputted to mouse motion filtering module 915. Mouse motion data can be generated by a mouse movement event. Mouse click data can be generated by a mouse click event. The mouse motion filtering module 915 can filter an actual mouse motion, when the mouse event is mouse movement, or an artificial mouse motion, when the mouse event is a mouse click or other non-movement event, e.g., as in Equation (10), for example. Data generated by the hand and/or finger gesture can be inputted to touch detection module 920. The touch detection module 920 can determine the gesture motion, e.g., as in step 515 of FIG. 5a. By way of example, the touch detection module can determine scroll motion.

The filtered mouse motion and the gesture motion can be inputted to motion suppression module 930. The motion suppression module 930 can correlate or integrate the mouse motion and the gesture motion in order to suppress an errant gesture motion, e.g., as in Equation (11). By way of example, the motion suppression module can suppress errant scroll motion. The output from the motion suppression module 930 can be fed to display module 935 to display in the UI the operation corresponding thereto. By way of example, the display module can display a cursor that did not move because errant scroll motion was suppressed.

In some embodiments, errant motion suppression can be implemented in an algorithm being executed by a host processor, e.g., host processor 828 of FIG. 8, where the algorithm can be located in software on the processor. In some embodiments, errant motion suppression can be implemented in an algorithm being executed by a panel processor, e.g., panel processor 802 of FIG. 8, where the algorithm can be located in firmware on the processor.

Figure 10:
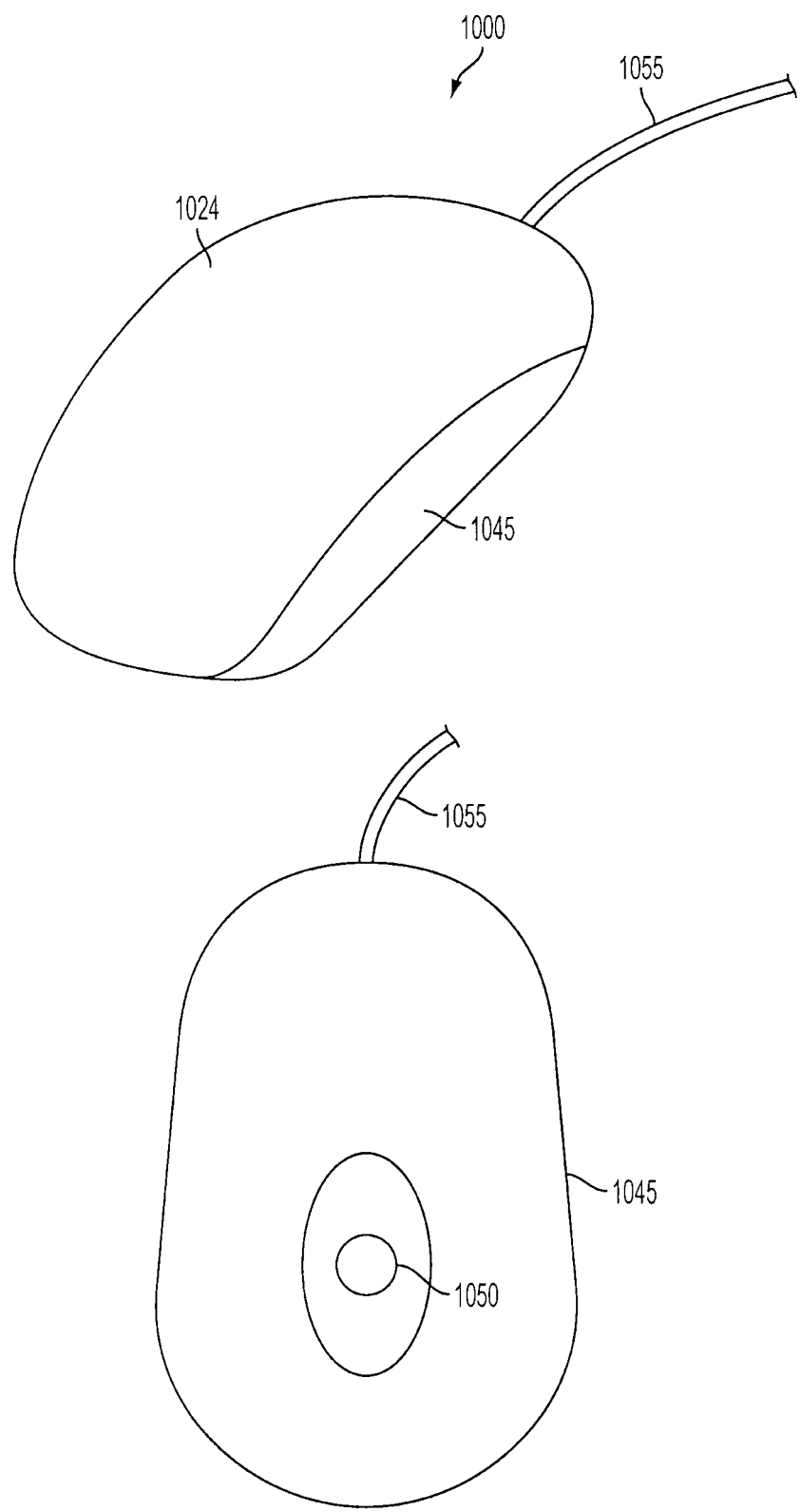
FIG. 10 illustrates an exemplary mouse that can include a touch sensor panel and other computing system blocks in the computing system of FIG. 8 that can execute errant motion suppression algorithms according to embodiments of the invention.

FIG. 10 illustrates top and bottom views of an exemplary touch sensitive mouse 1000 that can include a touch sensor panel 1024 on a mouse top surface, a base 1045, and a motion sensor 1050, e.g., an optical sensor, on a mouse bottom surface. The mouse 1000 can communicate mouse motion and scroll motion information to the computing system of FIG. 8 to execute errant motion suppression algorithms according to embodiments of the invention. In some embodiments, the mouse 1000 can communicate with the computing system via cable 1055. In some embodiments, the mouse 1000 can communicate with the computing system via a wireless connection.

Figure 11:
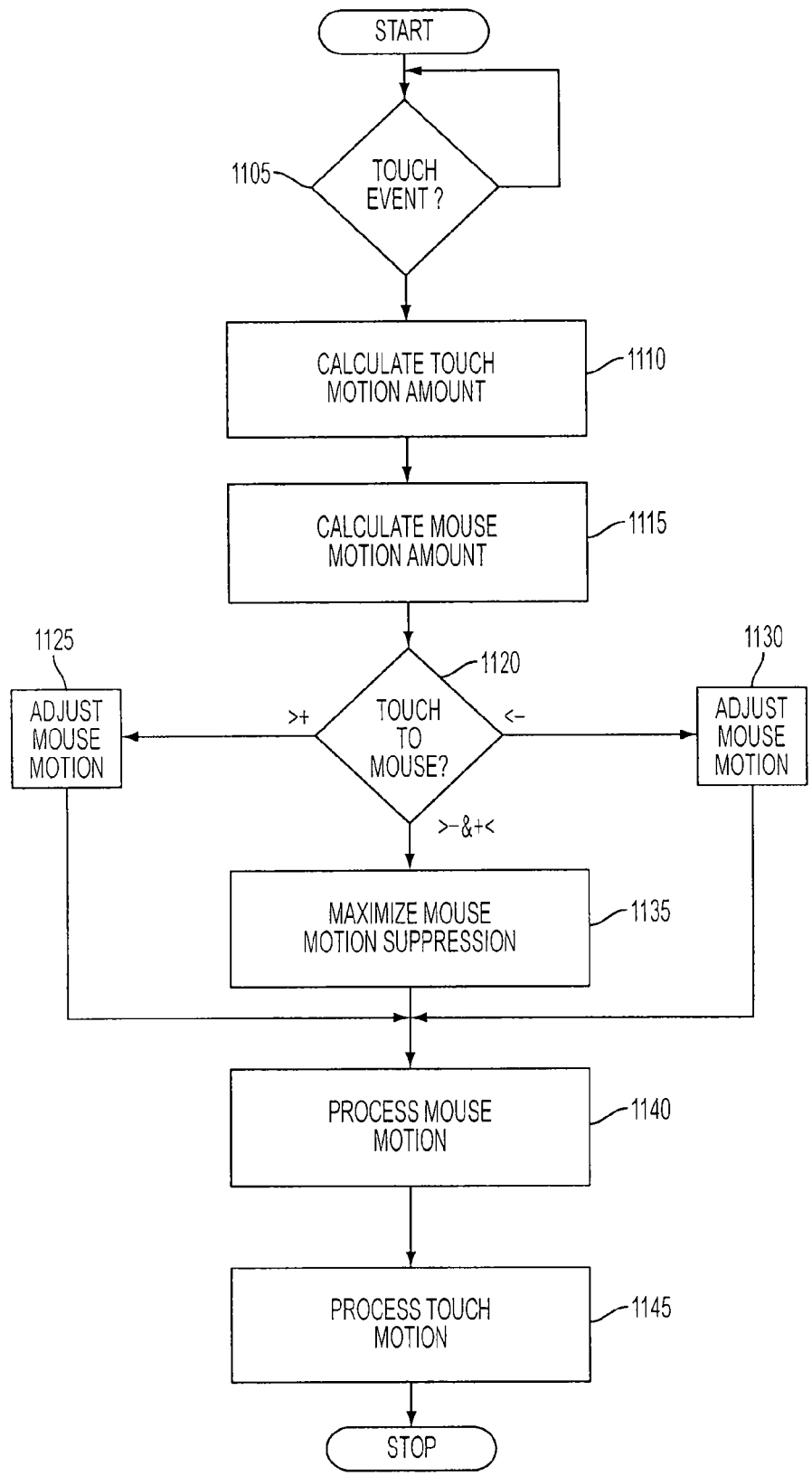
FIG. 11 illustrates an exemplary method for suppressing an errant mouse motion using a gesture motion in a detected touch on the mouse surface according to embodiments of the invention.

FIG. 11 illustrates an exemplary method for suppressing an errant mouse motion using a gesture motion in a detected touch on the mouse surface according to embodiments of the invention. Rather than suppressing an errant gesture motion taking into account mouse motion, as in some previously described embodiments, errant mouse motion can be suppressed taking into account gesture motion. By way of example, a rotate gesture (moving the thumb and forefinger in a rotating manner like unscrewing a bottle cap) on a mouse surface can cause the mouse to inadvertently move due to the robust nature of the gesture movements. In such a case, the input pointer can inadvertently move in the UI on the display screen in response to the errant mouse motion. Accordingly, the mouse motion can be suppressed using similar methodology to that for scroll suppression, as follows.

In the example of FIG. 11, a determination can be made whether a touch event has been detected on a touch sensitive surface of a mouse (1105). The touch event can be captured as one or more touch images over time, representing the pattern of the fingers touching the surface. If a touch event has been detected, the amount of motion in the touch event can be calculated (1110). For example, touch parameters, i.e., a centroid, major and minor radii, and/or total signal area, of the touches comprising the touch event can be determined using standard signal processing techniques. The front edge coordinates of the elliptical touch can be calculated as in Equation (1). The instantaneous touch motion between consecutive touch images comprising the touch event can be calculated using the determined centroids, as in Equation (2), and integrated over a time period from time $t_0$ to time t, as in Equation (3), to get the accumulated touch motion at time t. The touch motion S(t) can be filtered using a filter, similar to Equation (10), to produce the touch filtered motion $S_f(t)$ at time t, as follows:

$$S_f(t) = (1-\alpha)S(t) + \alpha S_f(t-1), \quad (14)$$

where $\alpha$ is a filter factor, as described above regarding Equation (10).

The amount of mouse motion at time t, as in Equations (4)-(9), can be calculated (1115).

Similar to Equation (11), the calculated mouse motion v(t) at time t can be compared to the calculated touch filtered motion $S_f(t)$ at time t as follows (1120):

$$v(t) = v(t) - GS_f(t) \quad \text{if } v(t) > GS_f(t), \text{ or} \quad (15)$$
$$= v(t) + GS_f(t) \quad \text{if } v(t) < -GS_f(t), \text{ or}$$
$$= 0,$$

where G is the proportional gain and $GS_f(t)$ is a proportional amount of the touch filtered motion that the mouse motion can exceed in order to be considered a true mouse motion and not errant. Accordingly, the correlative effect between the mouse motion and the touch motion can be as follows. A larger touch motion can suppress at least a portion of the mouse motion because it is less likely that a user is moving the mouse at the same time that the user is making a touch gesture on the mouse surface. In contrast, a smaller touch motion can allow the mouse motion because it is more likely that a user is moving the mouse when there is little or no touch movement on the mouse surface.

It should be noted that the use of S(t) in Equations (14)-(15) to represent touch motion is not intended to limit the touch motion to scroll motion (for which S(t) is previously used above), but merely for ease of explanation. Rather, various touch gestures can be utilized according to embodiments of the invention.

If the mouse motion has a positive value and is greater than a positive proportional amount of touch motion, the proportional amount can be subtracted from the mouse motion to obtain a modified mouse motion taking into account the touch motion (1125). Alternatively, if the mouse motion has a negative value and is less than a negative proportional amount of touch motion, the proportional amount can be added to the mouse motion to obtain a modified mouse motion taking into account the touch motion (1130). Otherwise, the mouse motion can be set to zero to obtain maximum mouse motion suppression taking into account the touch motion (1135).

The resulting mouse motion can be processed to move the input pointer in an UI on the display screen of a computing system if the mouse motion is an intended (or true) motion or to keep the input pointer stationary if the mouse motion is errant (1140). The touch motion can be processed to determine the gesture and trigger the corresponding operation of the computing system (1145).

It is to be understood that the mouse motion suppression methods are not limited to those described herein, but may include additional or other steps capable of suppressing mouse motion according to embodiments of the invention. It is further to be understood that methods for minimizing adverse noise and merged touches can be applied to mouse motion suppression, similar to those described above for scroll motion suppression.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for suppressing an errant motion using input device and touch information, comprising:
    determining an input device motion;
    identifying a touch motion in a detected touch on an input device surface;
    comparing the determined input device motion to the identified touch motion; and
    suppressing at least a portion of the identified touch motion based on the comparison of the identified touch motion to at least a portion of the determined input device motion;
    wherein comparing at least the portion of the determined input device motion to the identified touch motion comprises determining whether the identified touch motion is greater than the portion of the determined input device motion.

2. The method of claim 1, wherein the determining of the input device motion comprises determining an input device raw speed based on change in the (x, y) coordinates of the input device over time.

3. The method of claim 2, wherein the determining of the input device motion comprises filtering the determined input device raw speed to provide an input device filtered speed.

4. The method of claim 1, wherein the identifying of the touch motion comprises determining a touch speed based on change in the (x, y) coordinates in an image of the detected touch over time.

5. The method of claim 1, wherein the suppressing of at least a portion of the identified touch motion comprises setting the identified touch motion to zero if the identified touch motion is less than the portion of the determined input device motion.

6. The method of claim 1, wherein the touch motion is a scroll motion.

7. A method for suppressing errant motion using input device and touch information, comprising:
    determining a front edge of a detected touch on an input device surface;
    calculating a touch motion based on change in the (x, y) coordinates of the determined fron edge in an image of the detected touch over time; and
    determining whether the calculated touch motion is errant based on a comparison of the touch motion to detected input device motion;
    wherein determining whether the calculated touch motion is errant comprises determining whether the calculated touch motion is less than a portion of the detected input device motion.

8. The method of claim 7, wherein the determining of the front edge comprises:
    extracting a centroid of the detected touch from the image of the detected touch;
    extracting a major radius of the detected touch from the image of the detected touch; and
    calculating an offset from the extracted centroid to the determined front edge based on the extracted major radius.

9. The method of claim 8, wherein the calculating of the offset comprises:
    determining whether the extracted major radius exceeds a saturation point at which system noise has an adverse effect; and
    if so, adjusting the extracted major radius to a saturation value.

10. A method for suppressing errant motion using input device and touch information, comprising:
    applying a filter to an image of a detected touch on an input device surface to distinguish between a motion in the detected touch and a touch detection error, the filter passing the detected touch for the motion and eliminating the detected touch for the touch detection error; and
    determining whether the detected touch motion is errant based on a comparison of the detected touch motion to detected input device motion;
    wherein the comparison of the detected touch motion to the detected input device motion comprises determining whether the detected touch motion is less than the detected input device motion.

11. The method of claim 10, wherein the filter takes into account at least one of system noise or an erroneous image.

12. A non-transitory computer readable medium comprising program code for suppressing an errant motion using integrated input device and touch information, the program code for causing performance of a method comprising:
    responsive to an input device event, determining whether a touch motion is detected in a detected touch on an input device surface; and
    if so, suppressing at least a portion of the detected touch motion based on the comparison of the detected touch motion to at least a portion of an input device motion associated with the input device event;
    wherein the comparison of the detected touch motion to at least the portion of the input device motion associated with the input device event comprises determining whether the detected touch motion is less than the portion of the input device motion associated with the input device event.

13. The non-transitory computer readable medium of claim 12, where the determining whether the touch motion is detected comprises:
    distinguishing between a finger movement and a finger flattening in the detected touch based on whether a tip of the finger moves over time, wherein the finger tip moves over time for the finger movement and remains stationary over time for the finger flattening;
    ignoring the finger flattening; and
    determining that the finger movement comprises a touch motion.

14. The non-transitory computer readable medium of claim 12, wherein the suppressing of at least a portion of the detected touch motion comprises:
    determining the input device motion; and
    comparing a portion of the determined input device motion to the detected touch motion.

15. The non-transitory computer readable medium of claim 14, wherein the determining of the input device motion comprises:
    determining whether the input device event comprises intended input device movement; and
    if not, setting the input device motion to an artificial motion value.

16. The non-transitory computer readable medium of claim 12, the program code further for causing performance of a method comprising:
    applying a filter to a centroid of an image of the detected touch to distinguish between movement in the detected touch and a touch detection error,
    wherein the filter passes the centroid for the movement and eliminates the centroid for the touch detection error.

17. The non-transitory computer readable medium of claim 12, wherein the input device event is at least one of an input device shift, an input device click, an input device wake-up, or an input device lift.

18. A computing system comprising the non-transitory computer readable medium of claim 12.

19. A computing system, comprising:
an input device including
at least one motion sensor configured to detect a motion of the input device, and
at least one input sensor configured to detect a touch motion in a input on a surface of the input device; and
a processor in communication with the input device and configured to
compare the detected input device motion with the detected touch motion, and
suppress at least a portion of the detected touch motion based on the comparison of the detected touch motion to at least a portion of the detected input device motion;
wherein comparing the detected touch motion to at least the portion of the detected input device motion comprises determining whether the detected touch motion is less than the portion of the detected input device motion.

20. The computing system of claim 19, wherein the at least one input sensor is at least one touch sensor configured to detect the touch motion in a touch on the surface of the input device.

21. The computing system of claim 20, wherein the at least one touch sensor is incorporated into a touch sensor panel disposed on the surface of the input device.

22. The computing system of claim 19, wherein the input device motion is detected for at least one of an input device shift, an input device click, an input device wake-up, or an input device lift.

23. A method for suppressing an errant motion using input device and touch information, comprising:
determining an input device motion;
identifying a touch motion in a detected touch on an input device surface;
comparing the determined input device motion to the identified touch motion; and
suppressing at least a portion of the determined input device motion based on the comparison of the determined input device motion to at least a portion of the identified touch motion;
wherein comparing the determined input device motion to at least the portion of the identified touch motion comprises determining whether the determined input device motion is greater than the portion of the identified touch motion.

24. The method of claim 23, wherein the determining of the input device motion comprises determining an input device raw speed based on change in the (x, y) coordinates of the input device over time.

25. The method of claim 23, wherein the identifying of the touch motion comprises determining a touch speed based on change in the (x, y) coordinates in an image of the detected touch over time.

26. The method of claim 25, wherein the identifying of the touch motion comprises filtering the determined touch speed to provide a touch filtered speed.

27. The method of claim 23, wherein the suppressing of at least a portion of the determined input device motion comprises setting the determined input device motion to zero if the determined input device motion is less than the portion of the identified touch motion.

28. The method of claim 23, wherein the touch motion is a rotate motion.

29. A method for suppressing an errant motion using integrated information, comprising:
determining a first motion;
determining a second motion;
comparing the determined first and second motions; and
suppressing at least a portion of the determined first motion as errant based on a comparison of the determined first motion to at least a portion of the determined second motion;
wherein comparing the determined first motion to at least the portion of the determined second motion comprises determining whether the portion of the determined second motion is greater than the determined first motion.

30. The method of claim 29, wherein the first motion is an input device motion and the second motion is a gesture motion.

31. The method of claim 29, wherein the first motion is a gesture motion and the second motion is an input device motion.

32. The method of claim 29, wherein the integrated information comprises input device information indicative of an input device motion and touch information indicative of a gesture motion.

* * * * *